(12) United States Patent
Nevaux

(10) Patent No.: US 7,625,011 B2
(45) Date of Patent: Dec. 1, 2009

(54) SYSTEMS AND METHODS FOR DAMPENING SEAT BELT LATCH VIBRATION

(75) Inventor: Kevin C. Nevaux, Peoria, AZ (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 145 days.

(21) Appl. No.: 11/760,264

(22) Filed: Jun. 8, 2007

(65) Prior Publication Data
US 2008/0303261 A1 Dec. 11, 2008

(51) Int. Cl.
*B60R 22/24* (2006.01)
(52) U.S. Cl. .................. 280/807; 280/808
(58) Field of Classification Search ........... 280/801.2, 280/808, 807, 801.1, 733
See application file for complete search history.

(56) References Cited

U.S. PATENT DOCUMENTS

| | | | |
|---|---|---|---|
| 4,548,425 A | 10/1985 | Evans | |
| 4,549,749 A | 10/1985 | Thomas | |
| 4,893,874 A * | 1/1990 | Childress et al. | ............ 297/483 |
| 5,074,590 A | 12/1991 | DiPaola | |
| 5,161,824 A * | 11/1992 | Li | .................. 280/808 |
| 5,214,827 A | 6/1993 | Yamanishi | |
| 5,957,499 A | 9/1999 | Kempf | |
| 6,336,662 B1 | 1/2002 | Kurita et al. | |
| 6,357,795 B1 | 3/2002 | Krauss et al. | |
| 6,679,520 B2 * | 1/2004 | Kurata et al. | ................ 280/733 |
| 6,726,287 B1 | 4/2004 | Janz | |
| 6,837,519 B2 | 1/2005 | Moskalik et al. | |
| 2006/0113786 A1 * | 6/2006 | Desmarais et al. | ....... 280/801.2 |

* cited by examiner

*Primary Examiner*—Ruth Ilan
*Assistant Examiner*—Keith Frisby
(74) *Attorney, Agent, or Firm*—Dinsmore & Shohl LLP

(57) ABSTRACT

According to one embodiment of the present invention a seatbelt system is provided having a seat belt with a latch slidably disposed thereupon and operable to connect with a buckle to fasten the belt, having a pillar extending within the vehicle and covered by a garnish and having a protrusion extending from the garnish configured to support at least a portion of the latch when the belt is retracted and unfastened such that the latch is restrained from rattling during vehicle travel.

16 Claims, 10 Drawing Sheets

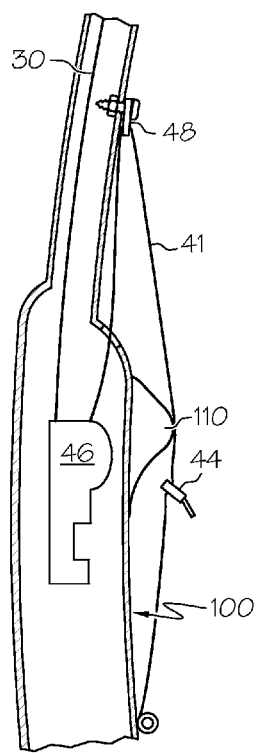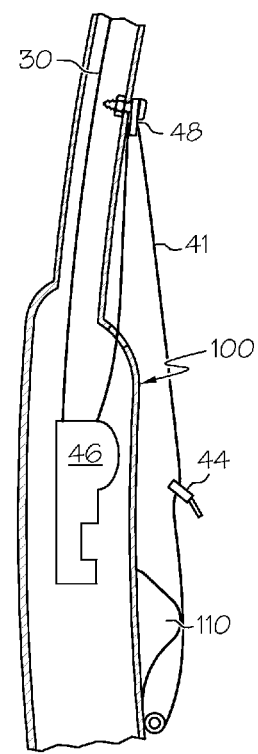
FIG. 7A
FIG. 7B

SYSTEMS AND METHODS FOR DAMPENING SEAT BELT LATCH VIBRATION

TECHNICAL FIELD

This invention generally relates to systems and methods for dampening seat belt latch vibration during vehicle operation and, more specifically, one embodiment relates to systems and methods for supporting at least a portion of the latch when a seat belt is in the fully retracted and unfastened position so as to reduce latch movement.

BACKGROUND

Generally, seatbelt systems are provided within vehicle compartments to restrain passengers in the event of a sudden stop or collision. Seatbelt systems generally include a belt, a buckle, a latch slidably disposed on the belt and a retractor for providing tension to the belt. Typically, one end of the belt is affixed to the retractor with the retractor being disposed near the base of a vehicle seat. The other end of the belt is provided through a guide affixed near the top of the vehicle seat and ultimately affixed to the base of the seat, near the retractor, thereby vertically suspending the belt inside the vehicle. The latch is slidably disposed upon the belt and configured to insert into the buckle. The buckle is configured to receive the latch and affixed to the base of the seat opposite the retractor.

When the latch is engaged with the buckle, the belt is provided across the user's lap, diagonally across the user's chest and over the user's shoulder. This configuration is considered a three-point restraint (since the passenger is restrained at both sides of the waist and over one shoulder) and is common in most vehicles. This restraint configuration has proven affordable, effective, compact and easy to operate.

However, when the restraint is not in use, the latch, being slidable upon the vertically suspended belt, may be suspended within the vehicle compartment. Changes in vehicle movement (e.g., road bumps, sudden braking, acceleration, sharp turning, etc.) may cause the latch to vacillate and create undesired noise. For example, the unlatched belt may be hung vertically along the vehicle pillar, and the latch, being slideable along the belt, may be free to move, rattle or bump against the pillar as the vehicle moves. As vehicle cabins become increasingly quieter, the slightest noise may disturb a passenger's driving enjoyment. Accordingly, there is a need for systems and methods that improve seat belt latch suspension within a vehicle.

SUMMARY

According to one embodiment, a seatbelt system is provided. The system can comprise a seat belt configured to restrain a passenger and a latch provided on the belt and operable to be connectedly engaged with a buckle to fasten the belt. The system can further comprise a pillar extending in the vehicle and a garnish at least partially covering the pillar. The system can also comprise at least one protrusion extending from the garnish and configured to contact a seat belt and provide additional tension to the belt when the belt is in the retracted and unfastened position such that the latch is restrained from rattling during vehicle travel.

According to another embodiment, a seat belt latch support system is provided. The system can comprise a garnish configured to at least partially cover a vehicle pillar disposed between an upper vehicle portion and a lower vehicle portion. The system can also comprise a protrusion extending from the garnish and configured to support a seat belt latch when the latch is unbuckled and retracted such that contact between the latch and the garnish is prevented.

According to another embodiment, a method for restraining a seat belt latch in a vehicle is provided. The method can comprise providing a seat belt configured to restrain a passenger and attaching a buckle within the vehicle. The method can further comprise engaging a latch with the belt, the latch being operable to be selectively engaged and disengaged with the buckle. The method can also comprise providing a pillar between an upper vehicle portion and a bottom vehicle portion and installing the seat belt near the pillar. The method may additionally comprise providing a garnish with a protrusion configured to support at least a portion of the belt when the belt is in the disengaged position and covering the pillar with the garnish.

Still other embodiments, combinations and advantages will become apparent to those skilled in the art from the following descriptions wherein there are shown and described alternative illustrative embodiments of this invention for illustration purposes. As will be realized, the invention is capable of other different aspects, objects and embodiments all without departing from the scope of the invention. Accordingly, the drawings and description should be regarded as illustrative only and not as restrictive.

BRIEF DESCRIPTION OF THE DRAWINGS

It is believed that the present invention will be better understood from the following description taken in conjunction with the accompanying drawings in which:

FIGS. 7A and 7B are side views of various exemplary locations of protrusions along a pillar garnish in accordance with two illustrative embodiments of the present invention;

DETAILED DESCRIPTION OF ILLUSTRATIVE EMBODIMENTS

Figure 1:
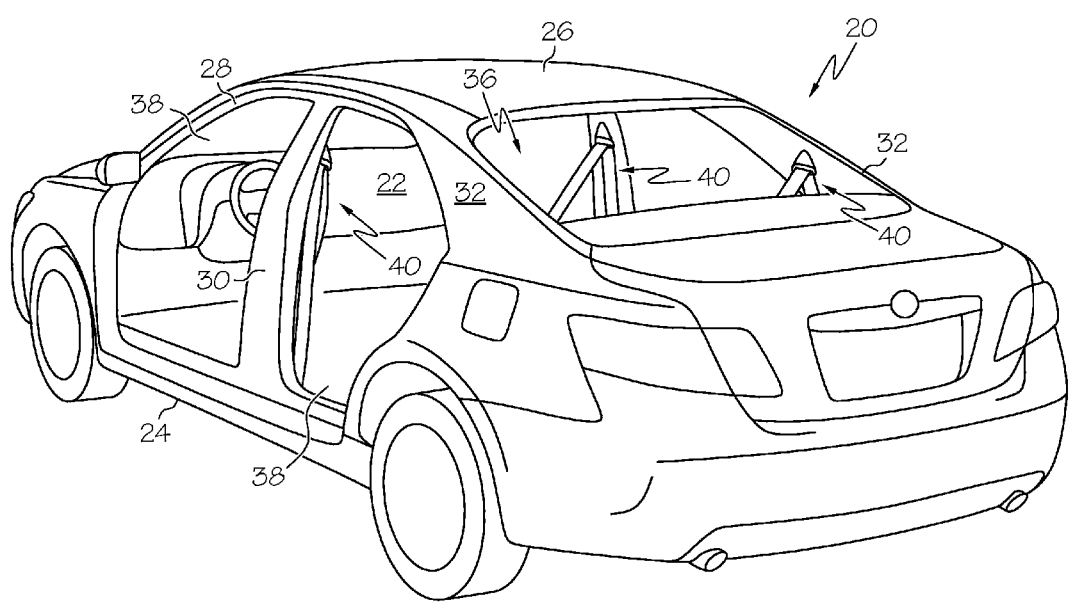
FIG. 1 is a general view of vehicle in accordance with one illustrative embodiment of the present invention.
Figure 2:
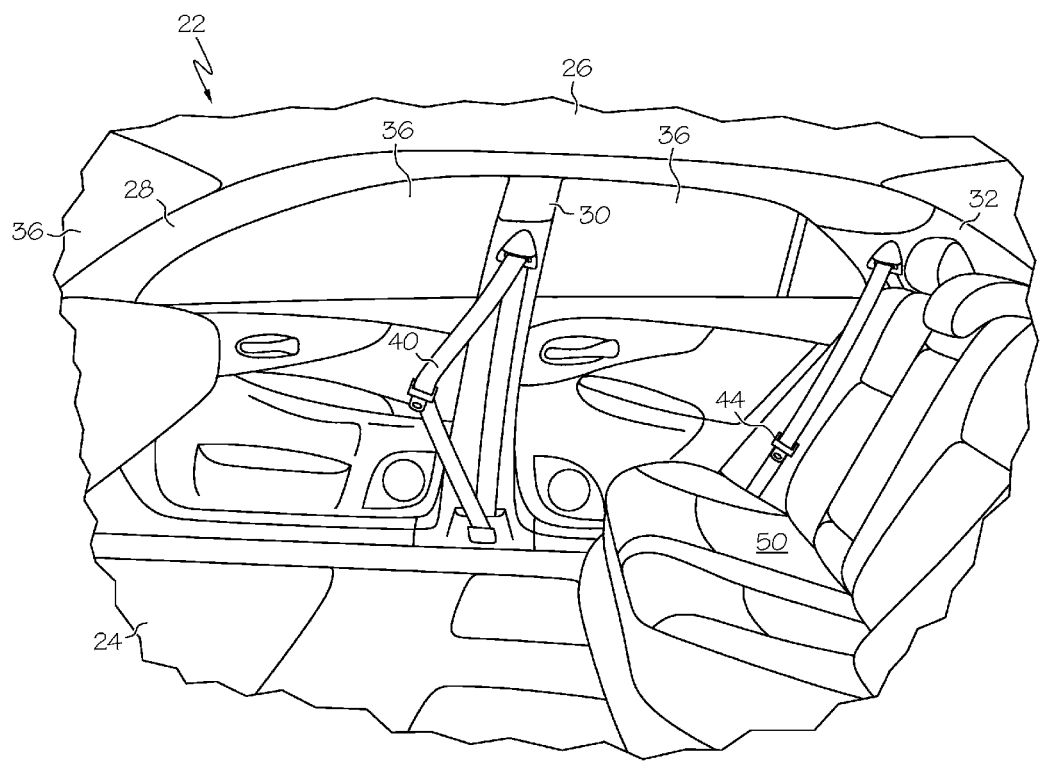
FIG. 2 is an interior view of a vehicle compartment in accordance with one illustrative embodiment of the present invention.
Figure 3:
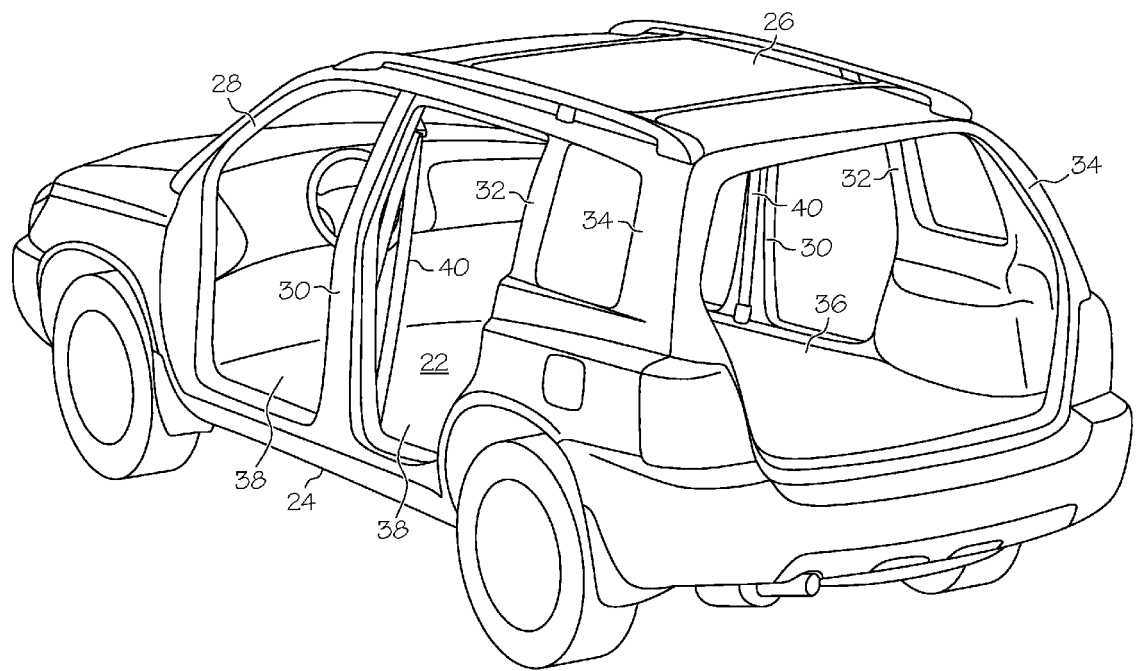
FIG. 3 is a general view of vehicle in accordance with one illustrative embodiment of the present invention.

Referring to the drawing figures in detail, wherein corresponding numerals indicate the corresponding elements throughout the drawings, FIGS. 1-4 illustrate conventional vehicle and passenger compartment configurations that may incorporate a seatbelt system and a system/method for dampening seat belt latch vibration according to an embodiment of the present invention. Vehicle 20 may comprise a vehicle compartment 22 having window openings 36 and door openings 38. Vehicle compartment 22 may be any portion of a vehicle capable of containing passengers in which a seatbelt system may be incorporated. Door openings 38 may be defined by vehicle compartment 22 to receive passengers into vehicle compartment 22. Likewise, window openings 36 may be defined by vehicle compartment 22 for visual or physical access to the vehicle's surroundings. Window openings 36 and door openings 38 may be located throughout the vehicle 20 to correspond with a particular vehicle configuration (e.g., four door openings corresponding with a four-door sedan such as in FIG. 2, five door openings corresponding with a van such as in FIG. 4, etc.). Vehicle compartment 22 may be configured in any manner to contain passengers now known or hereafter developed. Likewise, window openings 36 and door openings 38 may be configured in any manner to receive passengers or provide visual access now known or hereafter developed. It should be understood that the configurations of vehicle 20 and vehicle compartment 22 in FIGS. 1-4 are merely illustrative and may be any configuration capable of transporting a person restrained by a seatbelt system. For example, vehicle 20 may be a four-door sedan, as shown in FIG. 1, or a van, as shown in FIG. 3.

As shown in FIGS. 1-4 and 9, vehicle 20 may include pillar members 28, 30, 32, and 34. As is commonly understood, pillar member 28 may be identified as an A-pillar, pillar member 30 may be identified as a B-pillar, pillar member 32 may be identified as a C-pillar and pillar member 34 may be identified as a D-pillar. In one embodiment and as illustrated in block 930, one end of the pillar members 28, 30, 32, and 34 may be affixed to a lower vehicle portion 24, such as a floorboard, and another end of the pillar members 28, 30, 32 and 34 may be affixed to an upper vehicle portion 26, such as a roof. However in other embodiments, pillar members 28, 30, 32, and 34 may be engaged with or integral with other portions of vehicle 20, such as a fender, wall, wheel well, frame, firewall, or the like. In one embodiment, pillar members 28, 30, 32, and 34 may define window openings 36 and door openings 38 for physical and visual access through vehicle compartment 22. In other embodiments, pillar members 28, 30, 32, and 34 may be joined in other configurations or include other openings. For instance, pillar members 30 and 32 may be conjoined such that only two door openings are provided within vehicle 20 (i.e., a two-door vehicle). Pillar members 28, 30, 32, and 34 may be provided within vehicle 20 to give structural integrity to vehicle 20. It should be understood that pillar members 28, 30, 32, and 34 are merely illustrative and may be configured in any manner which may comport with a particular vehicle design.

As illustrated in FIGS. 1-6 and 9 and as described in block 900, vehicle 20 may include a seatbelt system 40 for restraining passengers in vehicle compartment 22 during a stop or sudden collision. In one embodiment, seatbelt system 40 may be a "three-point system" comprising a seat belt 41, a buckle 42, a latch 44, a retractor 46, a carrier attachment 48 and a seat 50. In such an embodiment and as shown in FIGS. 1-4, one end of seat belt 41 may be affixed to the lower vehicle portion 24. The other end of seat belt 41 may be provided through carrier attachment 48 and affixed to retractor 46. The seat belt 41, retractor 46 and carrier attachment 48 may be affixed within vehicle compartment 22 and arranged in any manner suitable to restrain passengers. For instance, seat belt 41 may be affixed near the lower vehicle portion 24, retractor 46 may be affixed near a pillar member, and carrier attachment 48 may be affixed above retractor 46 such that seat belt 41 is substantially vertically suspended within vehicle compartment 22. As explained in block 920, a latch 44 may be slidably disposed upon seat belt 41 and configured to engage buckle 42. As explained in block 910, a buckle 42 may be configured to receive latch 44 and may be affixed to the lower vehicle portion 24. A seat 50 may be provided within vehicle compartment 22 and between seat belt 41 and buckle 42 such that when latch 44 and buckle 42 are engaged, the seat belt 41 may be provided across the user's lap, diagonally across the user's chest and over the user's shoulder. Buckle 42, retractor 46, carrier attachment 48 and seat 50 may be affixed within vehicle compartment 22 using fasteners commonly used in vehicles such as anchors, bolts and the like.

Seatbelt system 40 is merely illustrative and may be configured to conform to any particular vehicle design or vehicle compartment design. Furthermore, it should be understood that other seatbelt systems now known or hereafter produced may be implemented within vehicle compartment 22. For instance, seatbelt system 40 may comprise a first seat belt 41 having a latch and affixed adjacent to seat 50, and a second seat belt 41 having a buckle and affixed adjacent to seat 50 and opposite the first seat belt (i.e., a four-point system). In addition, seatbelt system 40 may comprise first and second seat belts 41, each having a latch 44 and affixed adjacent to seat 50 and opposite each other having a buckle 42 provided therebetween, wherein latches 44 may be engaged with buckle 42 (i.e., a five-point harness). Additionally, seat belt 41 may be any material commonly used to restrain passengers such as a woven belt, strapping, webbing or the like.

Seatbelt system 40 may be provided within vehicle compartment 22 and arranged in any manner suitable to restrain passengers. In one embodiment and as shown in block 940 of FIG. 9, seatbelt system 40 may be installed near pillar members 28, 30, 32 or 34. In such an embodiment, retractor 46 and carrier attachment 48 may be affixed adjacent to pillar members such that seat belt 41 may be suspended adjacent to pillar members. In another embodiment and as shown in FIGS. 1-7, seatbelt system 40 may be affixed substantially parallel to pillar members 28, 30, 32 or 34. In such an embodiment, retractor 46 and carrier attachment 48 may be affixed to pillar members such that seat belt 41 may be suspended within vehicle compartment 22. In yet another embodiment, seatbelt system 40 may be provided between lower vehicle portion 24 and upper vehicle portion 26. In such an embodiment, retractor 46 may be affixed to the upper vehicle portion 26 and seat belt 41 may be affixed to lower vehicle portion 24 such that seat belt 41 may be suspended within vehicle compartment 22 irrespective of pillar member location. It should be understood that the locations of seatbelt system 40 are merely illustrative and may be located anywhere within vehicle compartment 22 to comport with a particular vehicle design.

Figure 4:
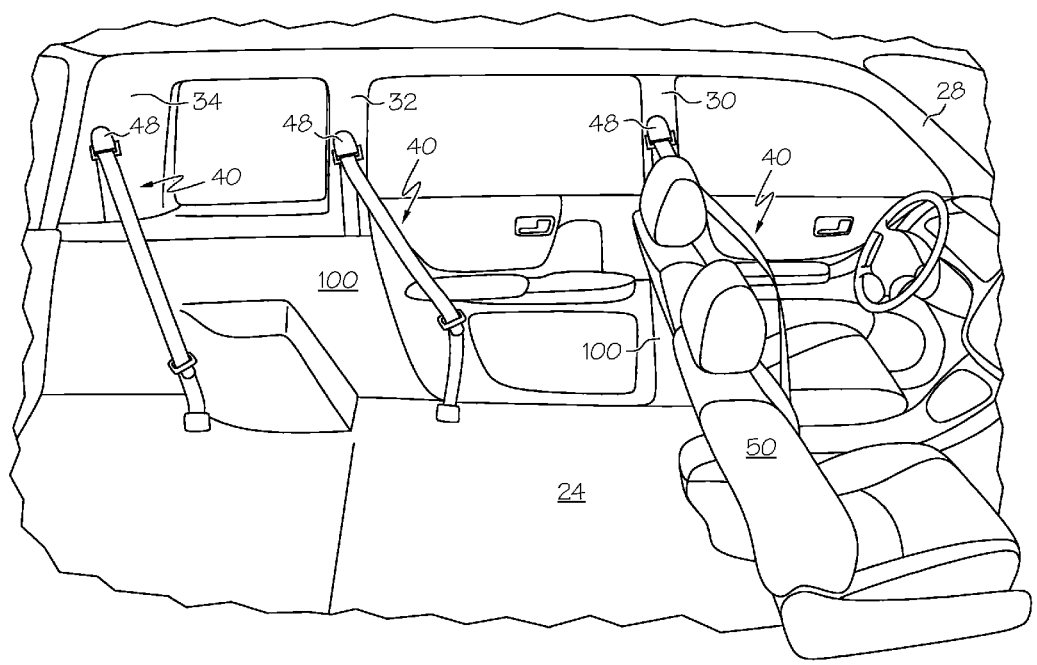
FIG. 4 is an interior view of a vehicle compartment in accordance with one illustrative embodiment of the present invention.
Figure 5:
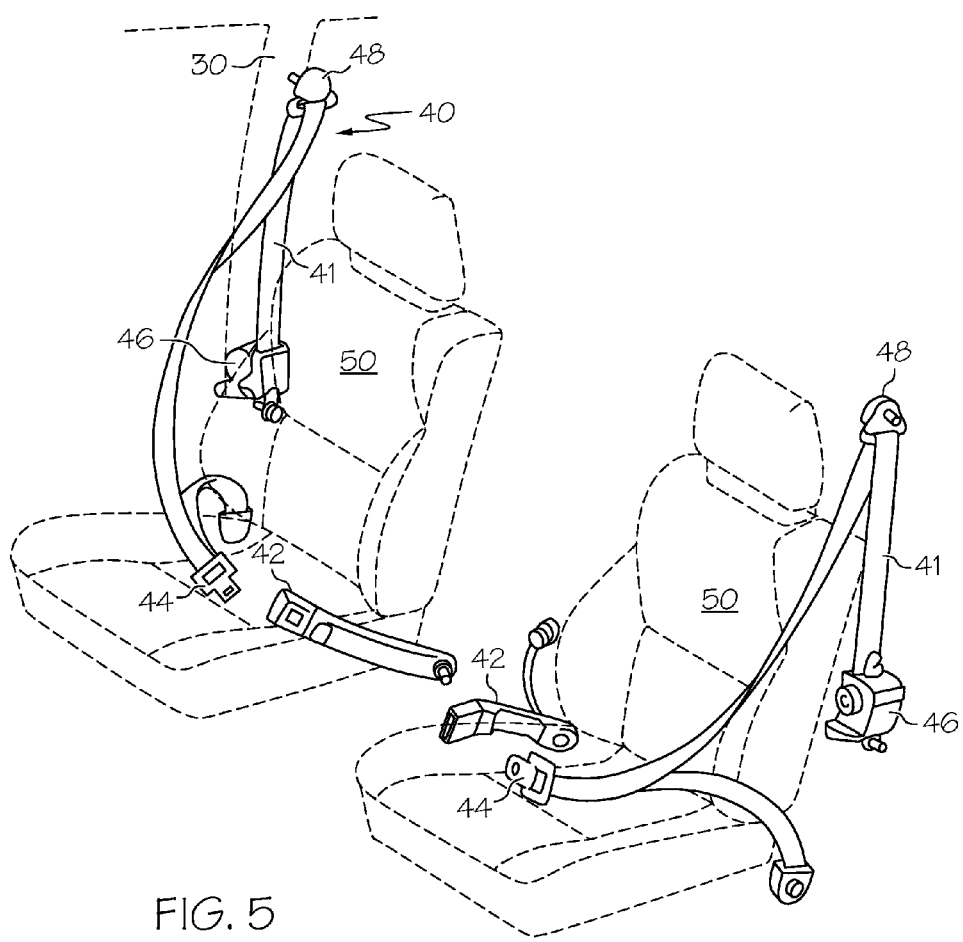
FIG. 5 is a general view of a seatbelt system in accordance with one illustrative embodiment of the present invention in accordance with one illustrative embodiment of the present invention.
Figure 6:
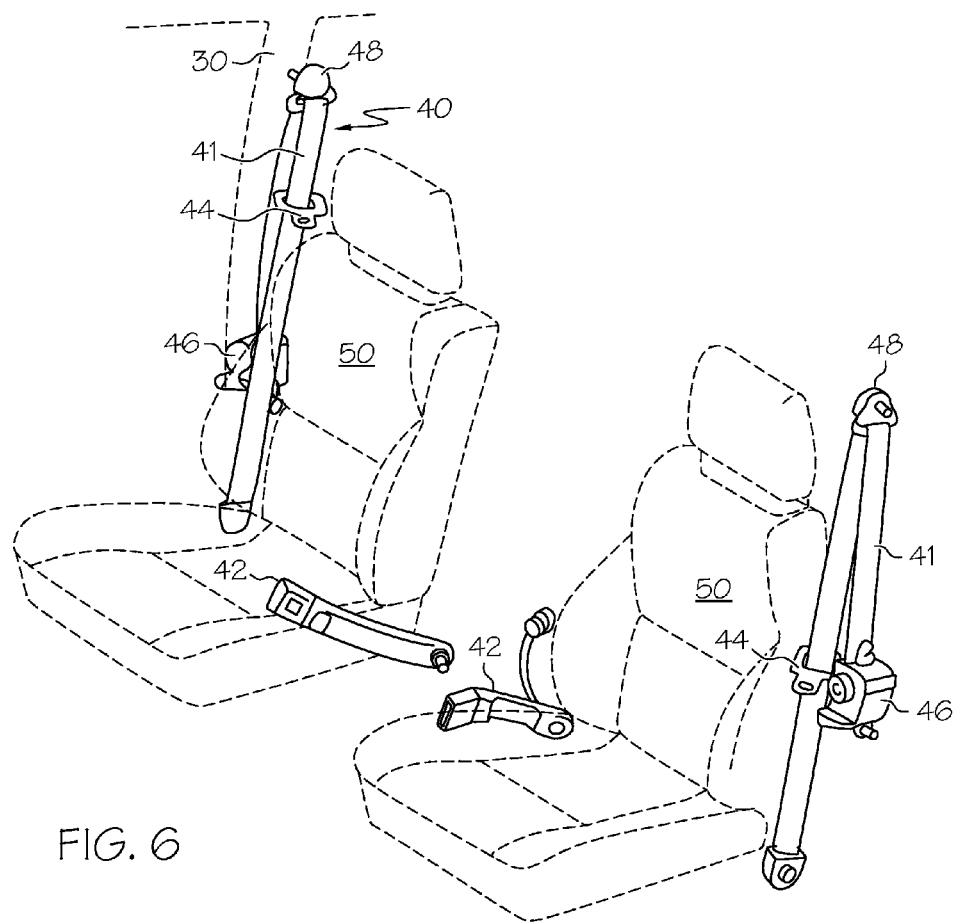
FIG. 6 is a general view of a retracted seatbelt system in accordance with one illustrative embodiment of the present invention.
Figure 7:
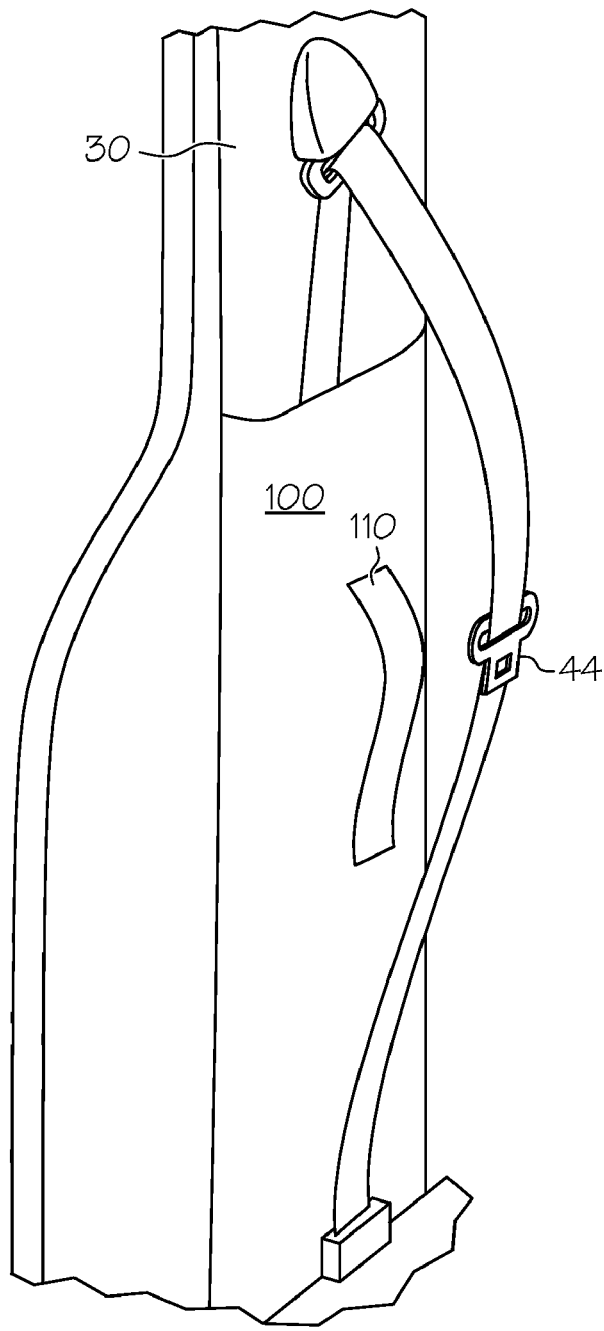
FIG. 7 is an exploded view of a protrusion extending from a pillar garnish in accordance with one illustrative embodiment of the present invention.
Figure 9:
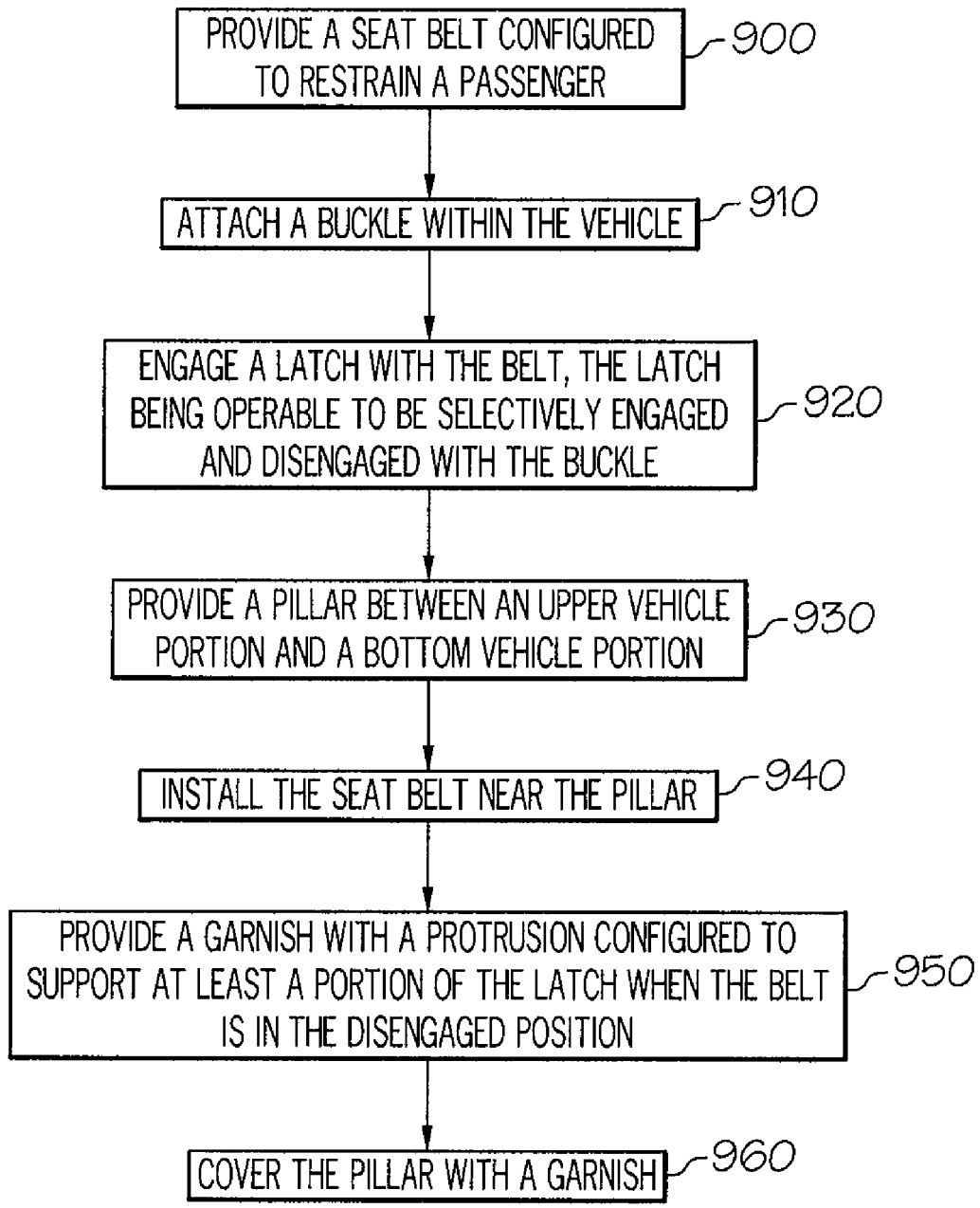
FIG. 9 is a flow chart of one method for restraining a seat belt latch in a vehicle in accordance with one illustrative embodiment of the present invention.

As shown in FIGS. 4, 7 and 9, and as explained in block 950, a pillar garnish 100 may be provided substantially alongside and partially covering a pillar member. Pillar garnish 100 may be provided within vehicle compartment 22 to cover pillar member and/or portions of seatbelt system 40 associated with pillar member and thereby improve appearance and/or match vehicle interior design. In one embodiment, pillar garnish 100 may be a substantially elongate member wherein the cross-sectional area may include a concave-shaped surface for accepting a pillar member. In another embodiment, pillar garnish 100 may be an elongate member wherein the cross-sectional area may include a convex-shaped surface having certain aesthetic qualities (i.e., smooth, textured, tinted, upholstered, etc.) for vehicle compartment 22. In other embodiments, pillar garnish 100 may be any shape and include any cross sectional shape for covering pillar member and/or seatbelt system 40. Pillar garnish 100 may be affixed to a pillar member using fasteners now known or hereafter developed such as screws, rivets, clips or the like. Conversely, pillar garnish 100 may be incorporated as part of pillar member such that pillar garnish 100 and pillar member may be unitary. Pillar garnish 100 may be comprised of any material suitable for use in a vehicle interior such as vinyl, plastic, wood, fiberglass, thermoplastics, polymers or the like. It should be understood that the embodiments described are merely illustrative and pillar garnish 100 may be configured in any manner suitable to comport with a particular vehicle design or seatbelt system.

As shown in FIGS. 4, 7 and 9, and as explained in block 960, pillar garnish 100 may partially cover seatbelt system 40. In one embodiment, where seatbelt system 40 is affixed to the lower vehicle portion and pillar member, pillar garnish may cover retractor 46. In such an embodiment, pillar garnish 100 may include an opening for providing seat belt 41 from retractor 46 through carrier attachment 48 to a passenger. When a seat belt 41 is retracted (i.e., during non-use) it may rest against pillar garnish 100 thereby causing latch 44 to contact the garnish 100. In another embodiment, where seatbelt system 40 is affixed to the lower vehicle portion 24 and pillar member, pillar garnish 100 may enclose carrier attachment 48. In such an embodiment, pillar garnish 100 may include an opening for providing seat belt 41 from retractor 46 and carrier attachment 48 to a passenger. During retraction (i.e., during non-use) seat belt 41 may rest against pillar garnish 100 thereby causing latch 44 to contact the garnish 100. It should be understood that the embodiments described are merely illustrative and pillar garnish 100 may be configured in any manner suitable to comport with a particular vehicle design or seatbelt system.

As illustrated in FIGS. 6-9, and as explained in block 950, a protrusion 110 may be provided to contact the seat belt and push the belt further from the pillar than it ordinarily would be. When a seat belt 41 is retracted (i.e., during non-use), seat belt 41 may rest against a surrounding surface such that latch 44 may contact the surrounding surface. During vehicle travel, a latch may repeatedly contact surrounding surfaces (e.g., of the pillar and/or belt) such that audible disturbances (i.e., vibration, rattle, noise, etc.) are produced. In one embodiment and as shown in FIG. 7, where a seatbelt system is affixed adjacent to a pillar member, a protrusion 110 may be provided within pillar garnish 100 to support latch 44. In such an embodiment, as a vehicle travels, latch 44 may be biased away from the surface of pillar garnish 100 such that latch 44 does not contact pillar garnish 100. In addition, retractor 46 may provide continuous tension on seat belt 41 wherein latch 44 may be secured against protrusion 110 by seat belt 41. In another embodiment and as shown in FIG. 7A, protrusion 110 may be provided adjacent to carrier attachment 48 and above the latch 44 to bias the seatbelt 40 (when it is retracted) further away from the pillar member than it ordinarily would be. In such an embodiment, additional tension is provided to the belt 40 (from retractor 46) such that latch 44 is suspended to minimize or eliminate contact with the pillar member during vehicle movement. In yet another embodiment and as shown in FIG. 7B, protrusion 110 may be provided adjacent to the lower vehicle portion 24 and below the latch 44 when the seatbelt 41 is retracted. Protrusion 110 may be located anywhere along pillar member 100 to provide additional tension to the belt 41 and restrain latch 44 from contacting the pillar (i.e., when seatbelt system 40 is retracted/unused).

In another embodiment, where seatbelt system 40 is not adjacent a pillar member, a protrusion 110 may provided anywhere within vehicle compartment 22 in accordance with a given resting location of latch 44 (i.e., when seatbelt system 40 is retracted/unused). For example, protrusion 110 may be provided on an interior wall of vehicle compartment 22, on a seat 50, on a door, or any other location conducive to supporting latch 44 depending upon the typical unused position of the latch for the given seatbelt system. In such an embodiment, as a vehicle travels, latch 44 may be biased away from the surrounding surface of pillar garnish 100 and retractor 46 may provide continuous tension on seat belt 41 wherein latch 44 may be secured against protrusion 110 by seat belt 41.

Protrusion 110 may be formed of any material suitable to support latch 44 such as vinyl, plastic, wood, fiberglass, thermoplastics, polymers or the like. Accordingly, protrusion 110 may be arranged upon a surrounding surface using methods of attachment or incorporation now known or hereafter developed. In one embodiment, protrusion 110 may be comprised of molded material and pillar garnish 100 may be integrally molded from the same material. In another embodiment, protrusion 110 may be separable from the surrounding surface and may be adhered to the surrounding surface using a bonding agent such as glue. In yet another embodiment, protrusion 110 may be detachable from the surrounding surface and attached using attaching methods now known or hereafter developed such as a screw, bolt, clip, pin or the like. It should be understood that the materials and attachment/incorporation are merely illustrative and may be any material or attachment/incorporation methods conducive to supporting a latch on a surface.

Figure 8A:
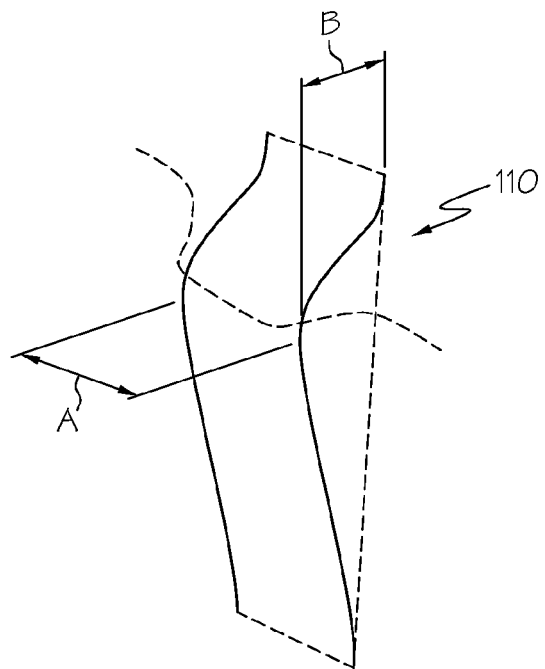
FIGS. 8A-8C are views of various embodiments of protrusions extending from a pillar garnish in accordance with one illustrative embodiment of the present invention.
Figure 8B:
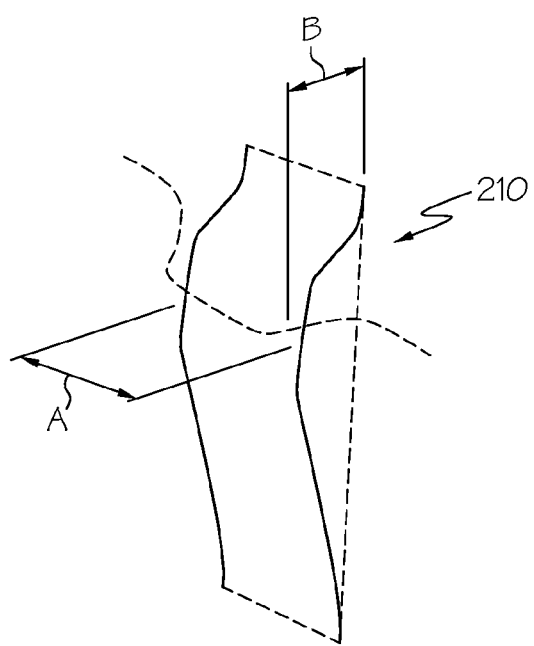
Figure 8C:
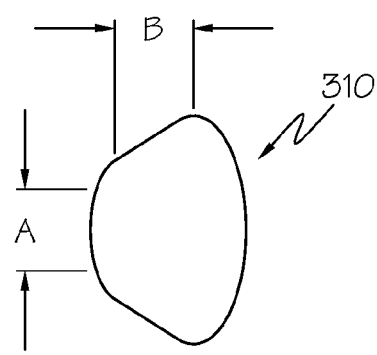

Protrusion 110 may be any shape conducive to supporting at least a portion of latch 44 or seat belt 41. In addition protrusion 110 may be any shape conducive to prevent seat belt 41 from twisting during seat belt travel along protrusion 110. In one embodiment and as illustrated in FIG. 8A, protrusion 110 may be substantially cuneiform or curvilinear in shape. In such an embodiment, the rounded surface may provide a contact point for seatbelt 41 or latch 44, wherein seatbelt 41 may be put in further tension and/or slack may be removed from seat belt 41 such that latch 44 may be restrained from easily resting against the pillar when the seat belt 41 is fully retracted (i.e., not in use). Additionally, the rounded surface may provide an unobstructed path upon which the seat belt 41 may travel without twisting. The amount that the protrusion 110 extends from the pillar can be selected such that the protrusion 110 removes excess slack in the belt. The distance that is optimal for this purpose can be chosen depending upon the seatbelt system at issue and the amount of distance that would have been between the belt and the pillar had the protrusion 110 not been present. The protrusion can, in some embodiments, provide some resistance against the force of the retractor 46, such that the latch is held without significant ability to move during typical vehicle travel. In another embodiment and as illustrated in FIG. 8B, protrusion 210 may be substantially cuneiform and having a substantially flat peak. In such an embodiment, the surface of the flat peak may provide a contact point for latch 44 or seatbelt 41, wherein latch 44 or seatbelt 41 may be restrained when the seat belt 41 is fully retracted (i.e., not in use). Additionally, the substantially flat peak surface may provide an unobstructed path upon which the seat belt 41 may travel without twisting. In another embodiment and as illustrated in FIG. 8C, protrusion 310 may be substantially frustoconical. In such an embodiment, the domed peak may provide a contact point for latch 44 or seat belt 41, wherein latch 44 or seat belt 41 may be restrained when the seat belt 41 is fully retracted (i.e., not in use). Additionally, the domed surface may provide an unobstructed path upon which the seat belt 41 may travel without twisting.

The width of the protrusion 110 may depend upon the width of the seatbelt 41 or latch 44. In one embodiment, the width of the protrusion 110 may be between about 20%-100% of the width of the seatbelt 41 or latch 44. In another embodiment, the width of the protrusion 110 may be between about 0% and about 100% of the width of the seatbelt 41 or latch 44. In another embodiment, protrusion may be at least 25 mm. A thinner protrusion may be chosen to provide less friction during seat belt retraction. It should also be noted that the width of the protrusion 110 may be wider than the seatbelt 41 or latch 44. However, such protrusion width may adversely affect the aesthetics of the vehicle interior, such that a protrusion width of less than 100% of the width of the belt may be desired in some embodiments.

The amount that the protrusion 110 extends from the pillar (i.e., protrusion depth) can be greater than the distance between the seatbelt 41 and the pillar such that the protrusion 110 provides tension to the belt and/or eliminates slack/space between the pillar and the seatbelt 41 or latch 44. The protrusion depth may depend upon the vehicle and seatbelt system 40 and the amount of distance between the seat belt 41 and the pillar (if the protrusion 110 were not present). In one embodiment, the protrusion depth may be at least the distance between the seat belt 41 and the pillar. In another embodiment, the protrusion depth may push the seat belt 41 or latch 44 further from the pillar between about 1% and about 50% of the distance between the seat belt 41 and the pillar. In yet another embodiment, the protrusion depth may be between about 18 mm and 30 mm. Of course, the distance between the seatbelt and the pillar may depend upon the orientation of the seatbelt system 40 within the vehicle and therefore may affect the protrusion depth. The protrusion can, in some embodiments, provide some resistance against the force of the retractor 46, such that the latch is held without significant ability to move during typical vehicle travel.

In some embodiments, it may be desirable to additionally provide a locking device at or near the protrusion to securely hold the latch, such that the latch can automatically engage the locking device when retracted and supported by the protrusion.

The foregoing description of the various embodiments of the invention has been presented for the purposes of illustration and description. It is not intended to be exhaustive or to limit the inventions to the precise forms disclosed. Many alternatives, modifications and variations will be apparent to those skilled in the art of the above teaching. For example, the seatbelt system in accordance with an embodiment of the present invention may comprise a seat belt, a pillar, a latch, a garnish and at least one protrusion extending from the garnish and configured to support at least a portion of the latch. Accordingly, while some of the alternative embodiments of the seatbelt system have been discussed specifically, other embodiments will be apparent or relatively easily developed by those of ordinary skill in the art. Moreover, although multiple inventive aspects and features have been described, it should be noted that these aspects and features need not be utilized in combination in any particular embodiment. Accordingly, this invention is intended to embrace all alternatives, modifications, combinations and variations.

What is claimed is:

1. A seatbelt system for a vehicle, comprising:
   a retractor configured to provide tension to a seat belt;
   a pillar extending in the vehicle;
   a garnish at least partially covering the pillar and spaced from the pillar defining a space extending along a length of the pillar between the pillar and the garnish;
   a seat belt configured to restrain a passenger, the seat belt having a first portion extending upwardly from the retractor within the space between the pillar and the garnish toward an upper vehicle portion and a second portion extending downwardly outside the space between the pillar and the garnish toward a lower vehicle portion;
   a latch provided on the seat belt and operable to be connectedly engaged with a buckle to fasten the seat belt; and
   at least one protrusion extending outwardly from the garnish away from the space between the pillar and the garnish and configured to contact the seat belt at the second portion of the seat belt at a location remote from the retractor to locate the second portion of the seat belt away from the garnish and to provide tension to the seat belt when the seat belt is in a retracted and unfastened position such that the latch is restrained from rattling during vehicle travel.

2. The system as recited in claim 1, wherein the protrusion is integrally molded with the garnish.

3. The system as recited in claim 1, wherein the protrusion has a rounded surface over which the seat belt is moved during use.

4. The system as recited in claim 1, wherein the protrusion is at least as wide as the seat belt.

5. The system as recited in claim 1, wherein the protrusion extends outwardly 18 mm or more from the garnish.

6. The system as recited in claim 1, wherein the pillar and garnish are integral.

7. The system as recited in claim 1 wherein the retractor is located within the space between the garnish and the pillar, the seat belt having one end connected to the retractor and an opposite fixed end at the lower vehicle portion.

8. The seat belt system of claim 7 further comprising a carrier attachment through which the seat belt extends, the first portion of the seat belt extending upwardly from the retractor, between the pillar and the garnish and through an exit opening in the garnish to the carrier attachment, the garnish having an interior surface region that is exposed to the seat belt within the space between the garnish and the pillar.

9. The seat belt system of claim 8, wherein the protrusion contacts the seat belt between the fixed end of the seat belt and the carrier attachment to locate the second portion of the seat belt away from the garnish and to provide tension to the seat belt when the seat belt is in-a retracted and unfastened position such that the latch is restrained from rattling during vehicle travel.

10. A seat belt latch support system comprising:
   a garnish connected to a vehicle pillar and configured to at least partially cover the vehicle pillar at a location between an upper vehicle portion and a lower vehicle portion, the garnish having a region spaced from the vehicle pillar defining a space between the garnish and the pillar through which a seat belt extends along a length of the pillar toward an upper vehicle portion, the garnish having an opening through which the seat belt exits the space between the garnish and the pillar; and
   a protrusion extending outwardly from the garnish away from the space through which the seat belt extends and configured to support a seat belt latch at a location away from the garnish when the seat belt latch is unbuckled and retracted such that contact between the seat belt latch and the garnish is prevented.

11. The system as recited in claim 10, wherein the protrusion is integrally molded with the garnish.

12. The system as recited in claim 10, wherein the protrusion has a rounded surface.

13. The system as recited in claim 10, wherein the protrusion is at least as wide as the seat belt latch.

14. The system as recited in claim 10, wherein the protrusion extends outwardly 18 mm or more from the garnish.

15. The system as recited in claim 10, wherein the pillar and garnish are integral.

16. The system as recited in claim 10, further comprising a retractor located within the space between the garnish and the pillar, wherein the seat belt having one end connected to the retractor and an opposite end fixed at the lower vehicle portion.

* * * * *